Nov. 8, 1927.  
E. G. CARR  
1,648,637  
MACHINE FOR PREPARING BASES FOR RAILS AND THE LIKE  
Filed April 27, 1922  7 Sheets-Sheet 4

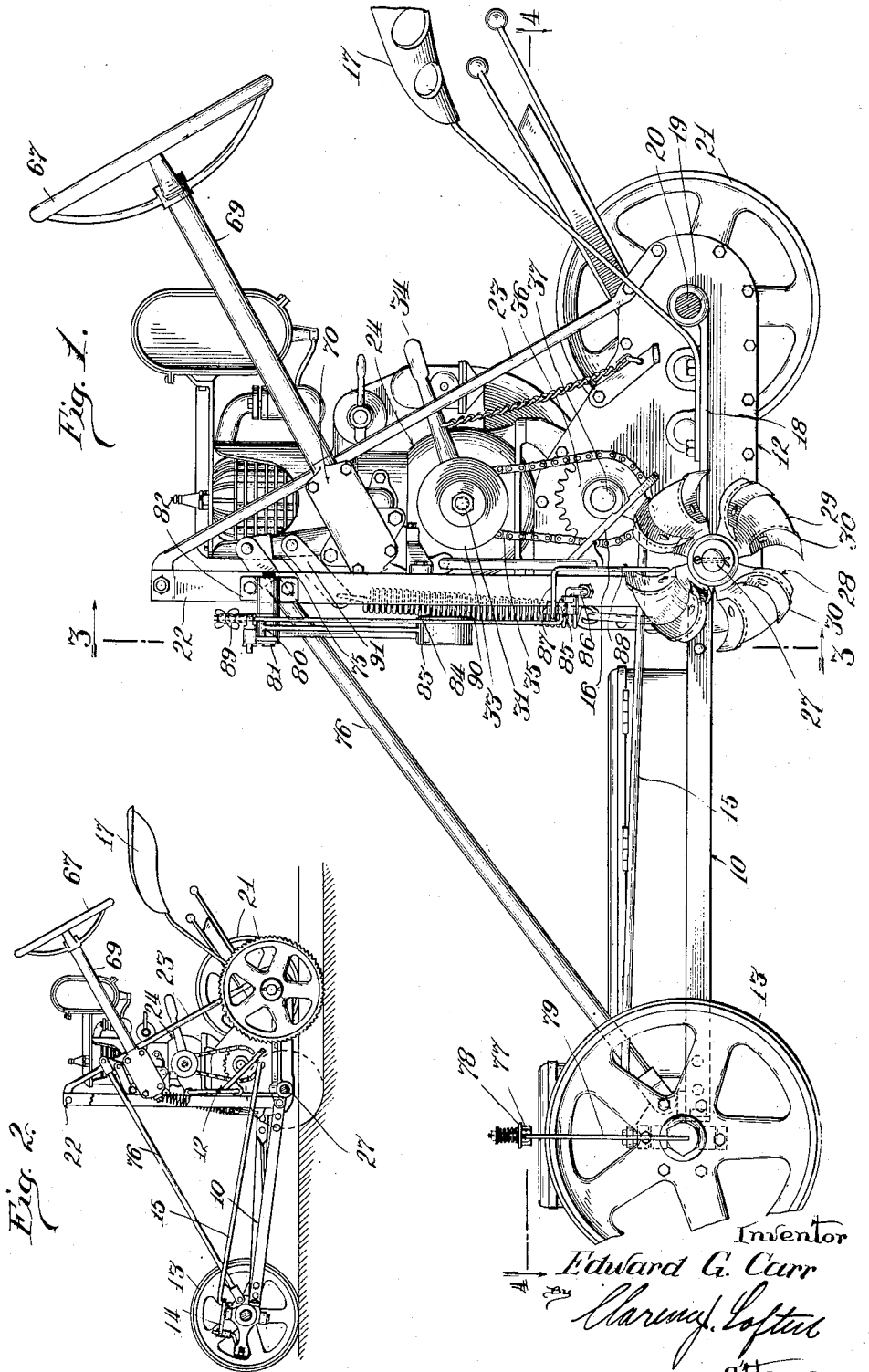

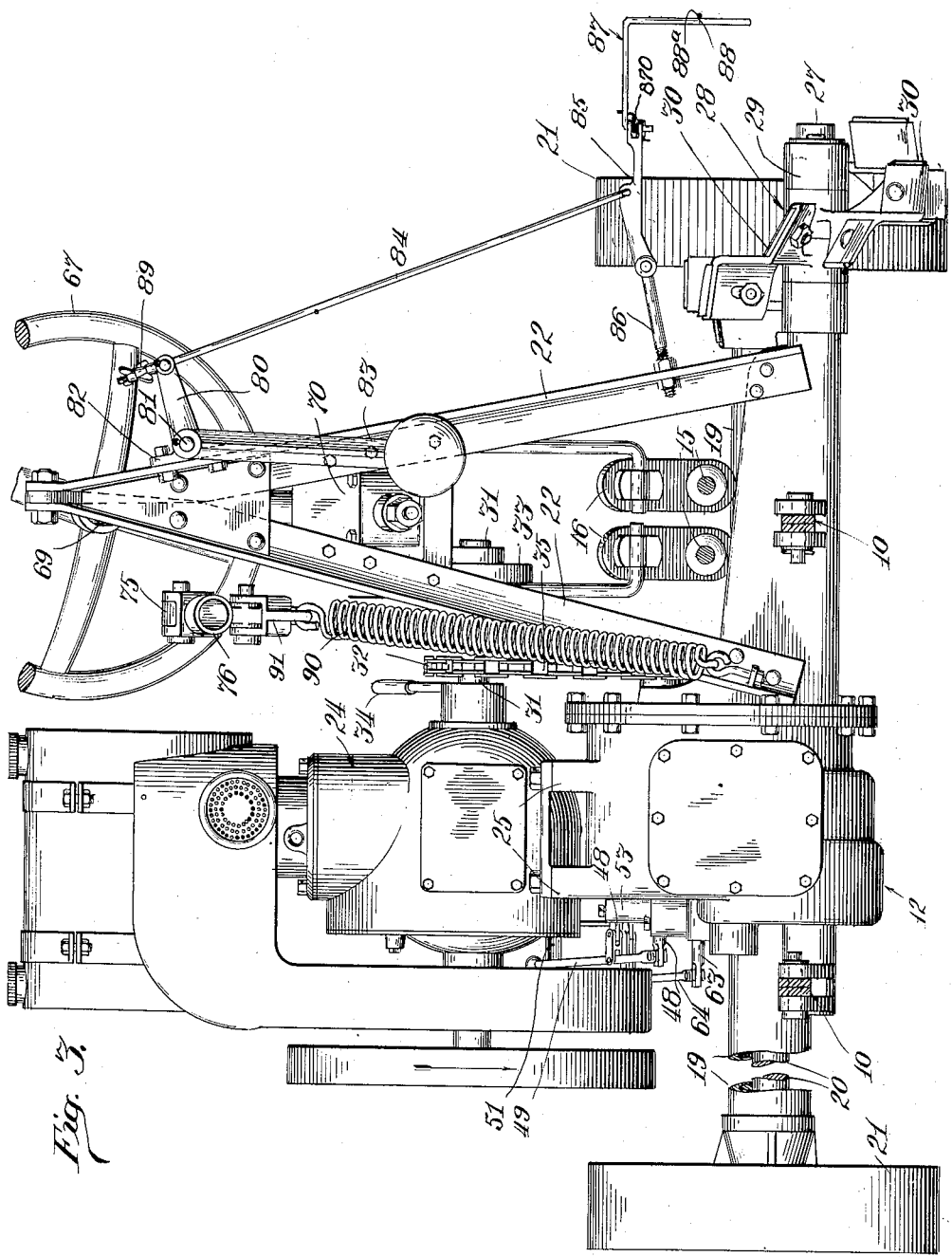

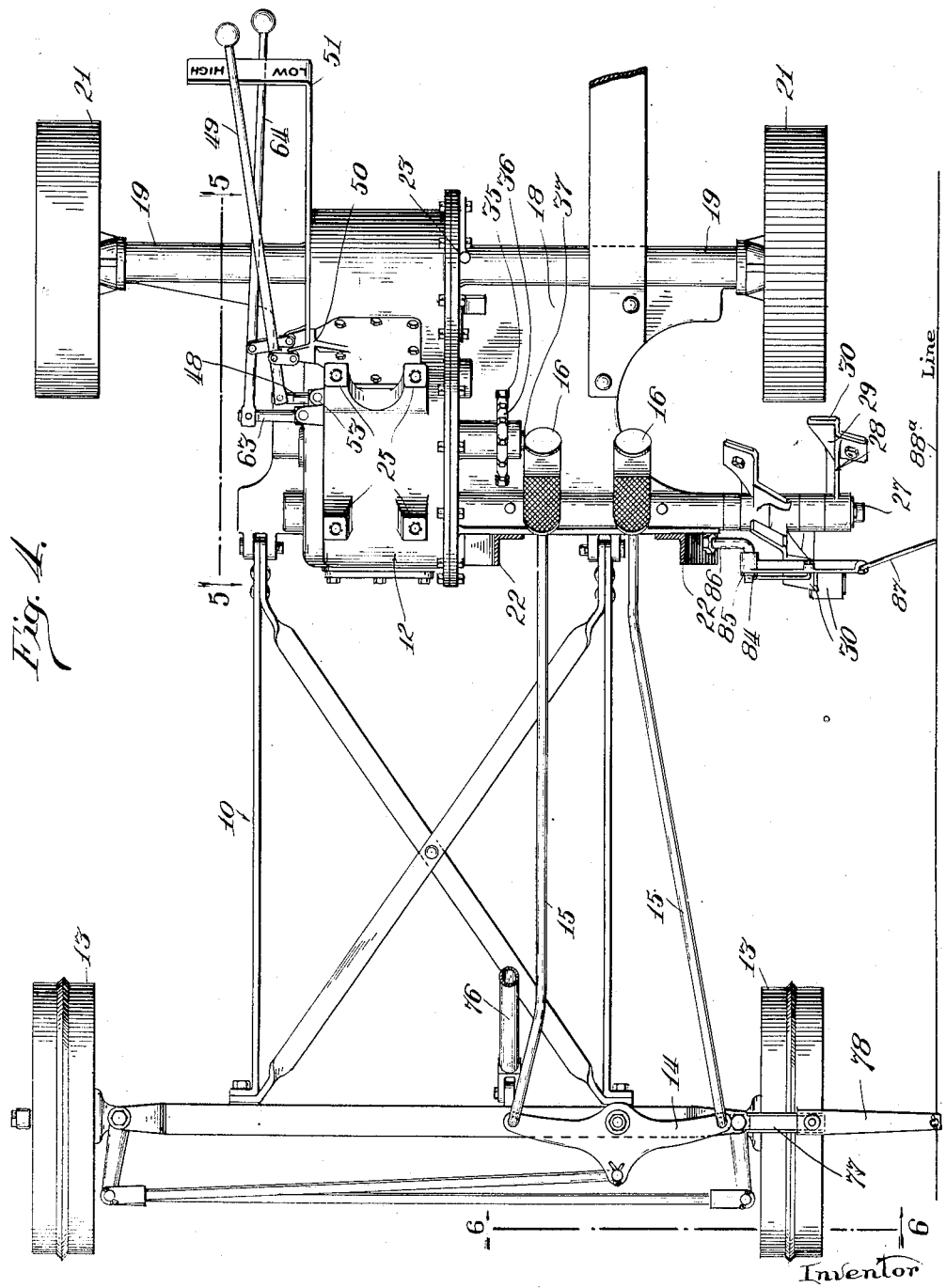

Inventor  
Edward G. Carr  
By Clarence Coftan  
Attorney.

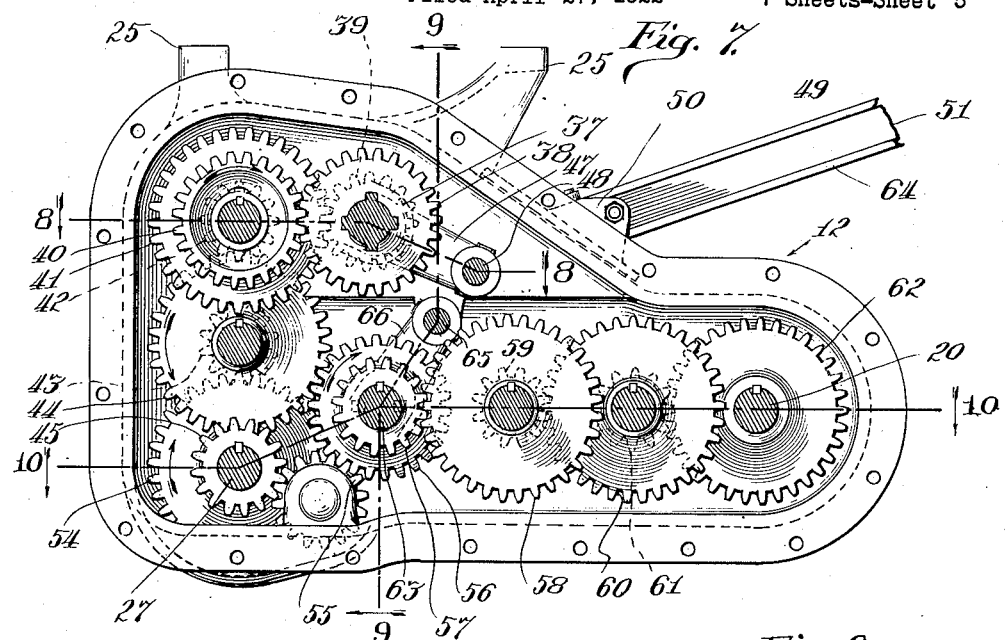
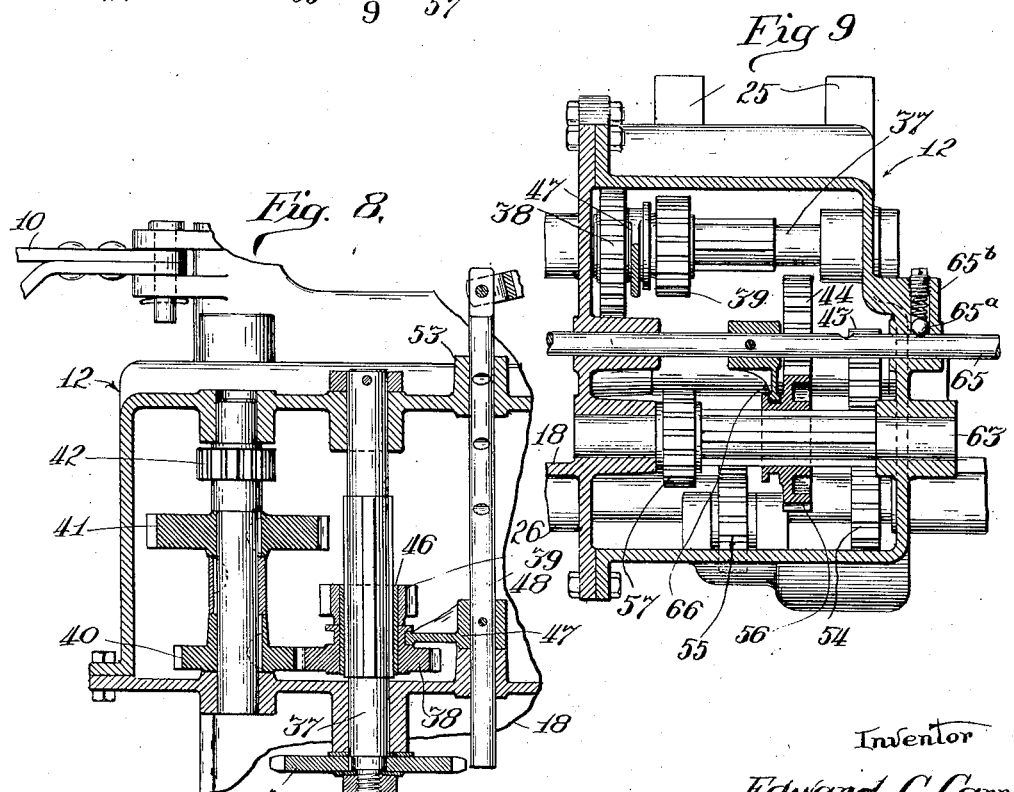

Nov. 8, 1927.

E. G. CARR 1,648,637

MACHINE FOR PREPARING BASES FOR RAILS AND THE LIKE

Filed April 27, 1922     7 Sheets-Sheet 6

Inventor
Edward G. Carr

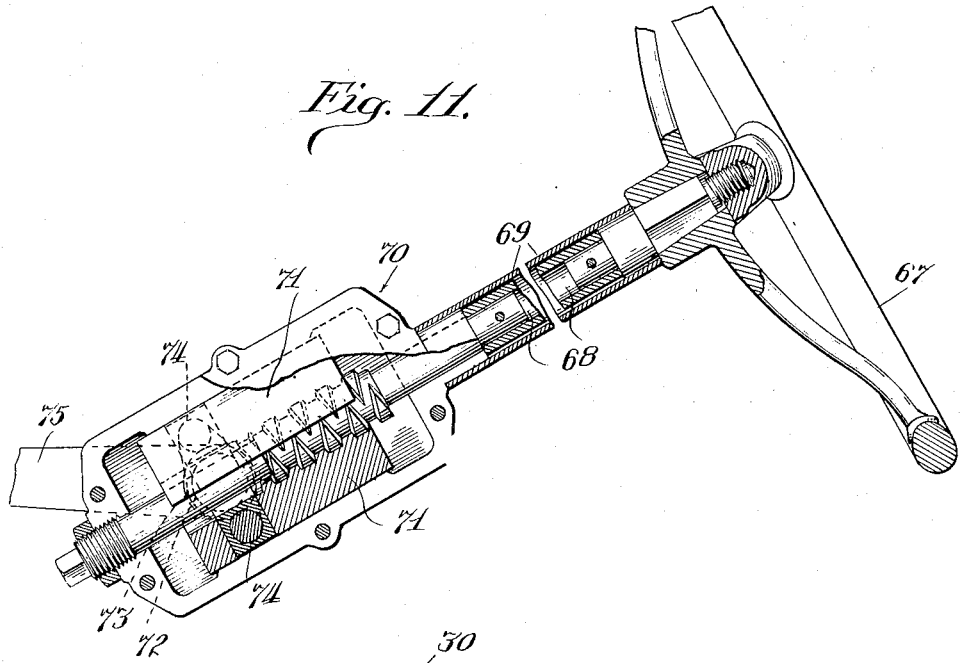
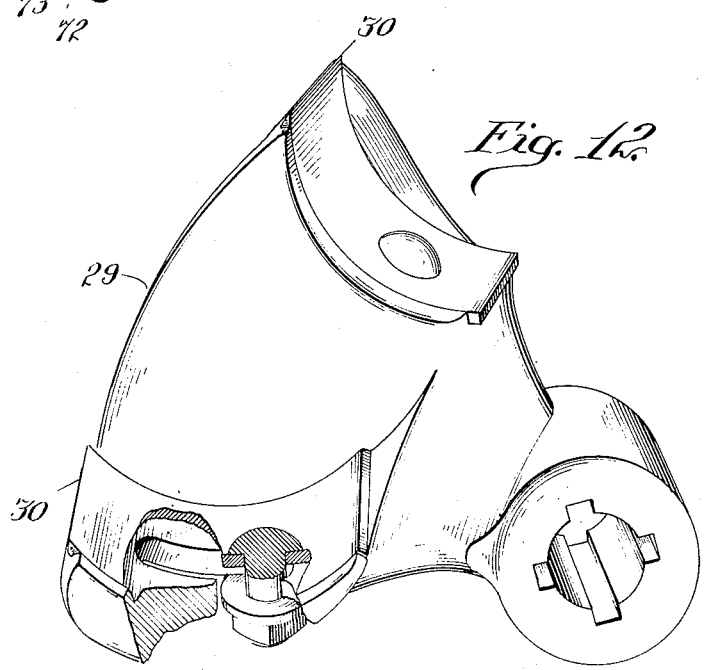

Patented Nov. 8, 1927.

1,648,637

UNITED STATES PATENT OFFICE

EDWARD G. CARR, OF CHICAGO, ILLINOIS.

MACHINE FOR PREPARING BASES FOR RAILS AND THE LIKE.

Application filed April 27, 1922. Serial No. 557,020.

In building concrete highways which are becoming so extensive throughout the country, it has been the practice for some time to utilize the forms for the sides of the concrete roadway as rails to support the heavy sub-grader, mechanical tamper and other devices thereon, which, when in operation, impose heavy and severe strains on such forms due to movement, vibration and otherwise. It is therefore desirable that these forms be placed on a substantial solid base which will be maintained until after the last operation on the concrete road bed has been effected. It is a well known fact that in preparing such bases for these forms by hand, as is now the practice, that it is almost impossible, however careful the skilled workman may be, to obtain a substantially solid base which is true to line, or direction, and grade within the limits of accuracy required by the specifications of the work. When so prepared by hand the grade is always sinuous, low in places and uneven throughout, and after the grade has been dug and the forms placed in position it is always necessary to align the forms vertically by tamping in by hand loose material where depressions, "hollows" or uneven surfaces or grades are left, whereby comparatively little of the original hard firm material base or foundation is in contact with the forms. As a result, under the strains imposed by the machines operating thereon, the forms easily and quickly settle, sag, rock and become out of vertical and horizontal alignment, thus preventing the machines from properly carrying out their intended work, such as preparing the sub-grade, spreading, tamping, or finishing the concrete.
The bases for these forms or rails are frequently cut in dry, compact roadways. Heretofore, this work has been done by hand with shovels, picks and the like, and necessitated digging a trench much wider than needed. This work is laborious, strenuous, tedious and slow and, as before stated, it is, as a financially reasonable undertaking, impossible to thus prepare or provide the much needed grade with a smooth, perfectly continuous solid base in true alignment.

It is therefore an object of my invention to provide a new and novel, self-contained, mechanically operated machine, simple in construction, accurate in operation and easily manipulated whereby a true, continuous grade with a solid base of original firm earth can be expeditiously and inexpensively prepared, true to a predetermined grade.

A further object is to provide a self-contained power propelled and operated machine of this type in which the cutting knives can be instantly, readily and finally adjusted and held to the exact pre-determined grade by the operator from a comfortable seat on the machine.

A further object is to provide a machine of this type with easily operated and highly sensitive foot control steering means so as to keep the cutting knives true to a pre-determined longitudinal line.

It is a further object to provide in a machine of this type means which at all times indicates to the operator the position of the cutter with respect to the pre-determined base, vertically, and the position of the cutter with respect to the pre-determined direction of the base to be cut.

It is a further object to provide in a machine of this character such flexibility that the cutter, regardless of the tilting of the machine, due to passing over depressions or uneven surfaces, will cut and plane off just to the desired depth or grade.

A further object is to provide a machine of this type with an oscillating frame on which the various parts are carried.

It is a further object to provide a machine of this type with frame members supported on the wheels and adapted to pivot or swing about the axis of the cutting shaft when the cutter is in operation.

It is a further object to provide a machine adapted to cut and plane off the uneven ground just the desired amount and afford a pre-determined base in order that every part of the form may rest on and be supported by solid earth. A further object is to provide a machine having highly sensitive readily controlled means for affording micrometer adjusting to the cutter. A further object is to provide a new and novel cutter.

The above and other features of novelty, advantages and capabilities, will become apparent from a detailed description of the accompanying drawings, in which I have illustrated one form of my invention, but the construction there shown will be understood as illustrative only and not as defining the limits of my invention.

Fig. 1 is a side elevational view of a machine embodying one form of my invention, showing the cutter out of contact with the roadway surface.

Fig. 2 is a similar view showing the cutter in operation.

Fig. 3 is a view partially in section, taken on the line 3—3 of Fig. 1.

Fig. 4 is a top plan view partially in section taken on the line 4—4 of Fig. 1.

Fig. 7 is a vertical sectional view through the transmission casing, showing the gearing therein.

Fig. 8 is a horizontal sectional view taken substantially on the line 8—8 of Fig. 7.

Fig. 9 is a vertical sectional view taken on the line 9—9 of Fig. 7.

Fig. 11 is an enlarged detailed view partially in section showing the connections with the means for vertically adjusting the cutter, and Fig. 12 is a perspective view of a section of the cutter.

Figure 5:
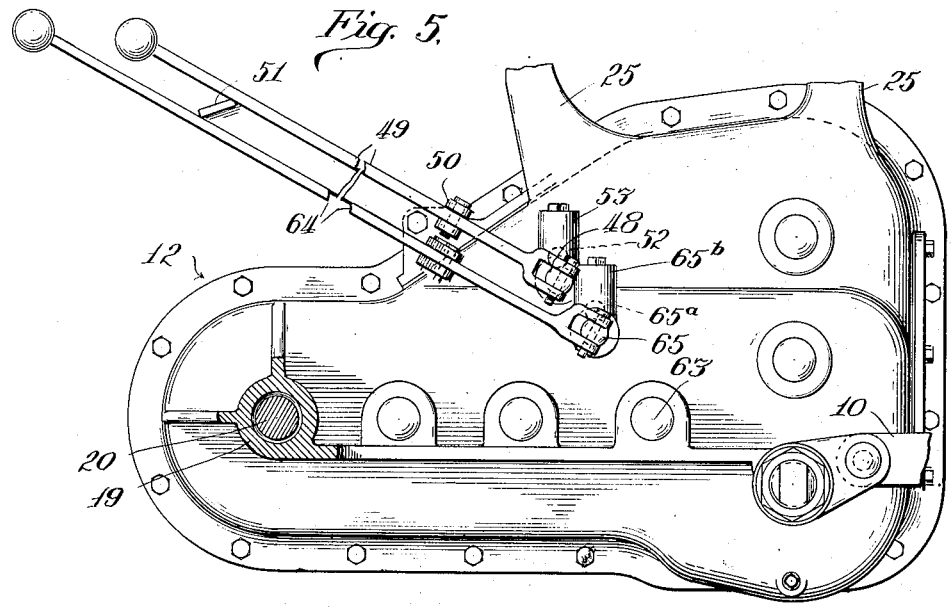
Fig. 5 is a detailed vertical sectional view, partially in elevation taken on the line 5—5 of Fig. 4.

Generally, the machine shown in the accompanying drawings, which, as before stated, illustrates one embodiment of my invention, consists of a four-wheel self-propelled machine, having front and rear axles carrying thereon a frame consisting primarily of front and rear portions pivotally connected together, transversely of the machine, a motor mounted on the frame, a cutter and planer to one side of the frame and immediately in front of one of the rear wheels, operative connections between the motor, the rear axle and the cutter and planer; foot control steering means, connecting with the front wheels, highly sensitive hand operative means for vertically adjusting the cutter-planer and means for indicating the vertical and horizontal alignment of the machine with respect to a pre-determined grade.

Referring to the drawings in detail, the front frame member consisting of side and cross members indicated as a whole by the character 10, is pivotally connected by any suitable means to the front side of the transmission casing 12, which casing forms the rear portion of the frame. The front frame member at its opposite end is suitably connected to the front axle, as best shown in Fig. 4, which axle is pivotally connected to the front wheels 13. These wheels are operatively connected by means of the rods and arms, shown in Fig. 4, to the link 14 which link is pivotally mounted on the front axle near one side thereof. This link near both ends is pivotally connected by means of the rods 15 to the foot operated steering pedals 16 placed in the rear portion of the machine and mounted on the transmission casing within easy reach of the operator. The operator's seat 17, is secured by means of the bolts (shown in Fig. 1) to the web 18 of the transmission casing. By pushing on the proper foot pedal the machine is turned to the right or left as desired as will be readily apparent from a glance at the drawings.

Rotatably mounted in the hollow aligned extensions 19 of the transmission casing is the rear axle 20 on which axle are non-rotatably mounted by key or other suitable means the rear or traction wheels 21, one of which wheels in the illustration shown,—the rear left,—is provided with serrations to afford better traction.

Secured to the front end of the transmission casing near one side thereof as best shown in Fig. 3 are two upwardly and inwardly inclined standards 22 secured together at their upper ends. Connected to the upper ends of these standards is a downwardly and rearwardly extending brace 23 which is secured at its lower end to the rear of the transmission casing. To one side of these upper inclined standards there is mounted on the transmission casing a suitable motor 24, in the illustration shown as a gasoline engine,—which is detachably secured to the supporting members 25 of the casing by bolts or other suitable means.

Rotatably mounted in the hollow bearings 26 of the transmission casing is the cutter and planer shaft 27 which has fixed to it by any suitable means near its outer end the cutter and planer 28 which is positioned in alignment with the rear left wheel of the machine. In my preferred form and as illustrated in the drawings this cutter comprises a plurality of sections, individually secured to the cutter shaft 27, each of said sections consisting of a hub with a radially extending arm or web with a projection extending from each side thereof, as clearly shown by the drawings. These sections may be termed blades and are designated by the reference numeral 29, and are illustrated by the drawings as secured to the cutter shaft 27 in different angular positions so as to present the appearance of a generally circular form, when viewed in the direction of the cutter shaft 27, but the arms or webs are offset with respect to each other, when looking at the blades in a direction at right angles to the cutter shaft 27. To these blades are removably secured by any suitable means, such as bolts shown, cutting and planing knives 30, which are illustrated by the drawings as curved in a radial direction and arranged in approximately a 45° angle to the surface of the ground and the axis of the cutter shaft, so that the action of the knives as they are rotated in clock-wise direction planes or shaves the base and performs their cutting operation in their upward travel throwing the removed material upwardly and outwardly to one side. In practice, the cutting and planing knives 30 while only about two inches in width are so staggered and positioned as to cut and plane a grade eight inches wide. It will thus be seen that the cutting effort is therefore only approximately equal to a one inch wide strip. By the use of a reduction gearing transmission, later to be described, the power cutter is enabled to cut and plane the hardest of clay. It will also be seen that when the knives become dull or possibly broken from encountering abnormal strains, they can be readily removed and replaced.

The motor shaft 31 is provided with a gear 32, belt wheel 33 and any suitable form of slidable clutch easily operated by the lever 34 from the operator's seat for throwing the motor shaft into or out of mesh with the gear 32 or belt wheel 33 as desired. The belt wheel 33 is conveniently placed and may be utilized for transmitting power to other machines. The gear 32 is by means of the gear chain 35 operatively connected to the driving gear 36 which gear is keyed to the transmission driving shaft 37 which shaft is rotatably mounted in aligned bearings in the transmission casings.

The transmission is of the sliding gear type.

Referring to Figs. 5, 7, 8, and 9, the shaft 37 drives the cutter and planer shaft 27 through the gears 38, 39, 40, 41, 42, 43, 44 and 45, at high speed when gear 38 is in mesh with gear 40 and at low speed when gear 39 is in mesh with gear 41. In order to change the speed it will be seen that gears 38 and 39 are fixed to a collar 46 slidable on the driving shaft 37 which collar is operatively connected by means of a lug or finger 47 to a slidable shaft 48 slidably mounted in the casing having one of its extended ends pivotally connected to the control lever 49 fulcrumed in the bracket 50 on the casing, which lever extends backwardly within easy reach of the operator,—its free end being adapted to register with the control indicating bracket 51. The slidable shaft 48 is provided with a plurality of indentations or notches adapted to register with a spring-actuated ball 52 mounted in the bearing 53 in the side of the casing, by means of which the gear clutch is firmly but yieldingly held in the desired position, that is, first speed, second speed or neutral.

The machine is driven forward at a working speed through the gears 44, 43, 54, 45, 55, 56, 57, 58, 59, 60, 61 and 62, when gear 56 is in mesh with the gear 55 and in a reverse direction through the gears 54, 56, 57, 58, 59, 60, 61 and 62, when the gear 56 is slid into engagement with the gear 54 and at a traveling speed forward through the gears 44, 56, 57, 58, 59, 60, 61 and 62 when the gear 36 is in mesh with the gear 44. The gear 56 is provided with a collar slidable on the shaft 63 and is shifted by the control lever 64 which is operatively connected with said gear through the slidable shaft 65 and lug 66. The control lever 64 like the control lever 49 is fulcrumed in the bracket 50 and extends backwardly within easy reach of the operator and registers with the control indicating bracket 51 on the under side thereof. The slidable shaft 65 like the shaft 48, is provided with notches or indentations adapted to register with a spring-actuated ball 65$^a$ mounted in the bearing 65$^b$ whereby the slidable gears are firmly but yieldingly held in the desired position, that is, working, reverse or traveling.

The highly sensitive, readily controlled means for raising and lowering the cutter and planer or rather, for adjusting and maintaining the effective cutting and planing depth of the knives at the pre-determined grade at all times will now be described: The adjusting wheel 67 positioned adjacent and immediately above the operator's seat, is fixed to a stem or shaft 68 rotatably mounted in the post 69, which post is secured by any suitable means to a casing 70, fast to the upwardly and inwardly inclined standards 22. The shaft or stem at and near its end within this casing is provided with right and left screw threads as best shown in Fig. 11, which threads cooperate with two slidable blocks 71, so that when the stem or shaft is turned by means of the wheel 67 these blocks are caused to move or slide in opposite directions. Mounted in this casing at right angles to the stem or shaft 68 is a stub shaft 72 which has rigidly fixed thereto on its inner end within the casing a link 73 which carries near its opposite ends pins 74 adapted to engage and register with openings in the sliding blocks 71. Rigidly fixed to the stub shaft outside the casing is an upwardly and forwardly inclined arm 75 which arm at its free end is pivotally connected with a downwardly and forwardly inclined rod 76 which rod at its opposite end is pivotally connected to the front axle. From this it will be seen that when the cutter and planer is out of engagement with the road surface the frame including the arm 75 and the rod 76 are in the position shown in Fig. 1, but when in operative position the parts are in the position shown in Fig. 2. It will also be seen that by merely turning the wheel 67 in the desired direction the rod 76 may be moved forwardly or by the operator that the arm 75 is moved forwardly or backwardly. When the arm 75 is moved forward the frame at its hinged connection may be raised until brought to the position shown in Fig. 1, and when the arm 75 is drawn backwardly the frame at its hinged connection, including the cutter and planer, is forced downwardly, for example, as shown in Fig. 2. This forced feed of the cutter and planer into the ground is brought about through and by the means described with almost micrometer adjustment. Viewing the machine from the rear it will be noticed that the rear left wheel is immediatey behind and in direct alignment with the cutter and planer so that it travels on the base cut and planed to the pre-determined grade while the other remaining wheels travel on the surface of the ground. In actual operation and under the ordinary conditions these other wheels must necessarily travel or pass over all sorts of uneven surfaces and encounter abnormal obtsructions and depressions, but with my invention such conditions do not in any wise interfere with the operator maintaining the cutter and planer at all times to the exact pre-determined grade, because the front wheels can be moved up or down, as the surface conditions, which they may encounter, vary. It will be readily understood from the foregoing description that the hinged connection of the two parts of the frame permits an upward or downward movement of the hinged ends of the two parts of the frame with respect to the front and rear wheels and that, as the cutter and planer 28 is located very close to the axis of hinging the two parts of the frame together, the cutter and planer 28 may be selected as a member of reference or the front and rear wheels may be selected as members of reference for the determination of the vertical location of the lowermost part of the cutter or planer 28. If rising ground be encountered by the front wheels, the front wheels can be elevated without changing the vertical position to be maintained by the cutter and planer 28. If descending ground be encountered by the front wheels, the front wheels can be lowered without changing the vertical position to be maintained by the planer and cutter 28, and it is obvious that the vertical position of the cutter and planer 28 can be changed by elevating or depressing the front wheels for that purpose. The left rear wheel tracks with the cutter and planer 28 so that any ordinary elevations or depressions which the right rear wheel may encounter simply tilts the machine sideways with respect to the cutter and planer 28 as a turning point without affecting the accuracy required. Fig. 4 of the drawings illustrates the rear wheels as tracking with the front wheels as a simple form of construction.

Figure 6:
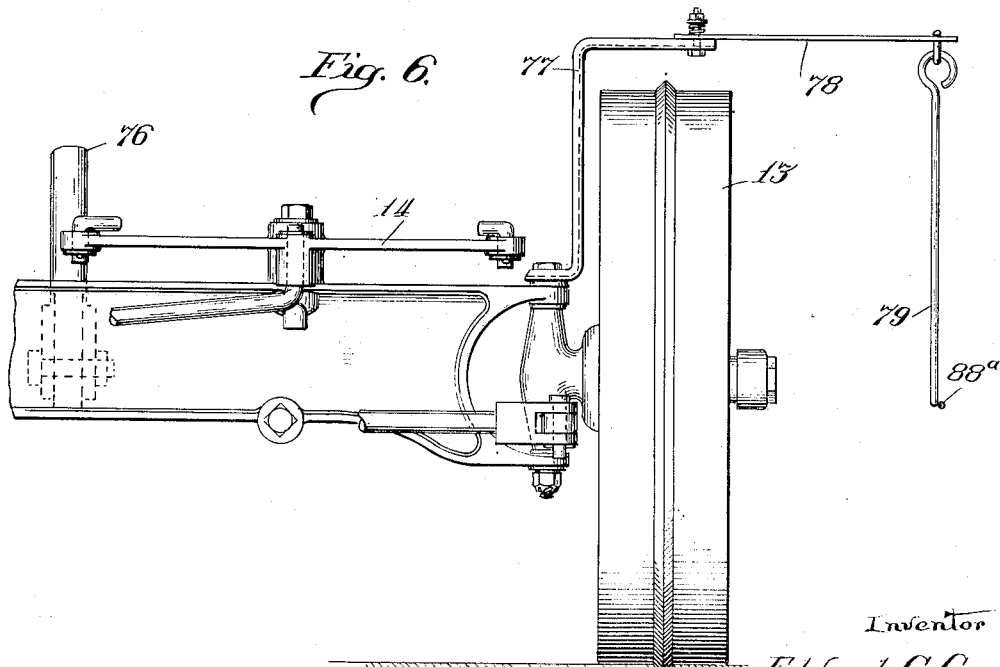
Fig. 6 is a front elevational view of a portion of the machine showing the guiding and steering means taken substantially on the line 6—6 of Fig. 4.
Figure 10:
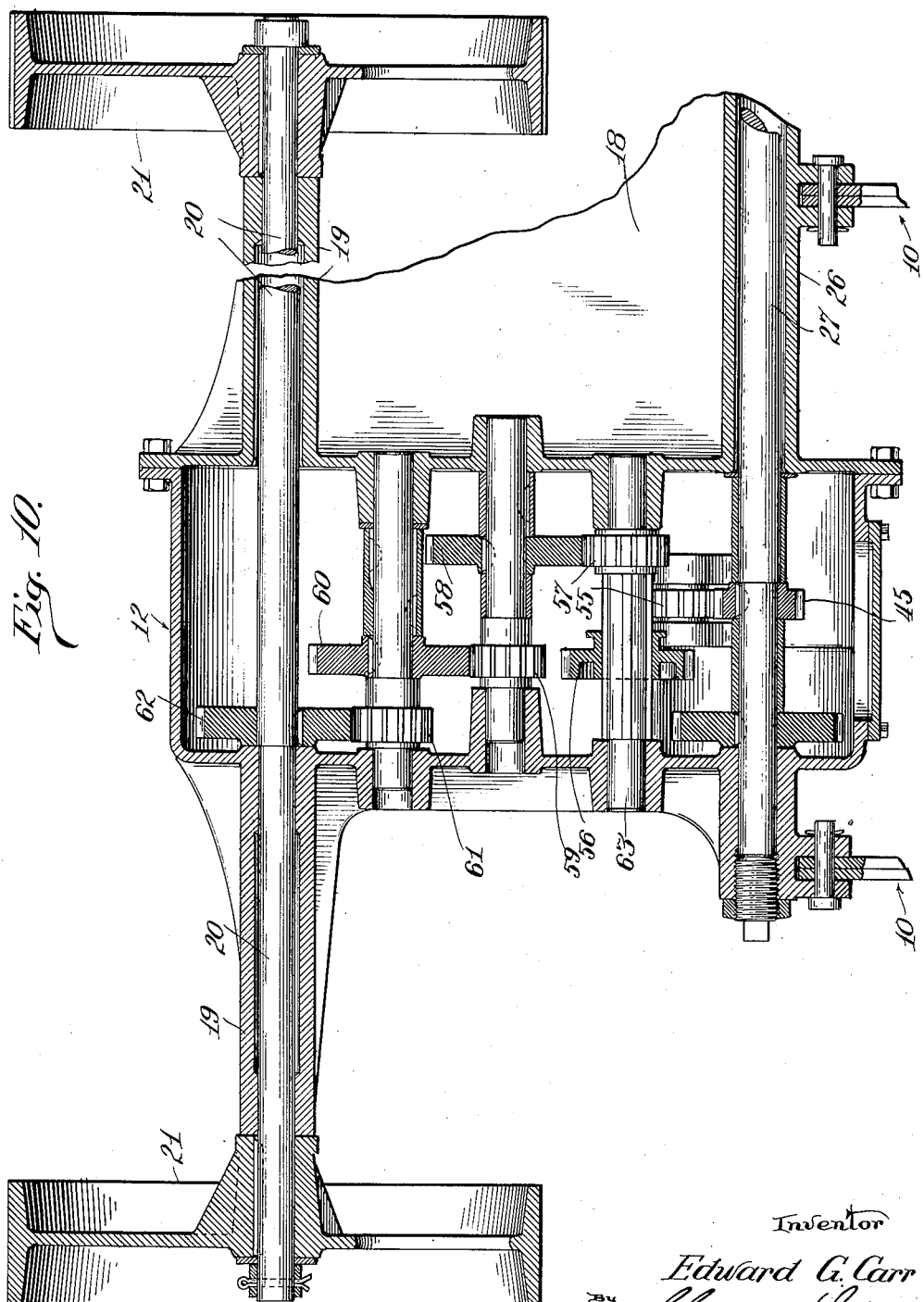
Fig. 10 is a horizontal sectional view through the transmission case and gearing, showing the shaft for driving the rear wheels and the shaft for driving the cutter in elevation, taken substantially on the line 10—10 of Fig. 7.

In the use of this machine in cutting and planing a grade for a supporting rail, it will be understood that the direction and grade of the work are established in any suitable manner and are commonly indicated by stakes driven into the ground. A cord, wire, or other suitable form of templet can then be placed as a guide to the operator of the machine both for direction of movement and for depth of cut. In order that the operator of my invention may readily see at all times that this machine is cutting and planing precisely the grade determined I have provided a steering guide and a grade guide. The steering guide, as best shown in Figs. 1 and 6, consist of an upwardly and outwardly extending arm 77 secured to the front axle on which is supported an adjustable extension 78 having a freely hanging indicator 79 depending therefrom to serve as a marker or sight in conjunction with the templet. Thus the operator can at all times determine whether or not he is steering in the correct direction.

The grade guide for the cutter as best shown in Fig. 3 consists of an arm 80 fixed to a shaft 81 rotatably mounted in the bracket 82 to which shaft is rigidly connected by means of a key or otherwise a pendulum 83. The arm 80 at its opposite end is pivotally connected by means of the link 84 to a swinging arm 85 pivotally connected to the standard 22 by means of the lug 86. In the arm 85 is pivotally mounted a hair spring pressed cutter and planer guide 87 which extends outwardly and downwardly with respect to the swinging arm 85. The hair spring 870 is illustrated by Fig. 3 of the drawings as a right hand spring with its upper end bent up behind the guide 87 and its lower end bent down behind the swinging arm 85, so that the guide 87 exerts only a slight pressure against the templet. The downward extending portion of this guide is marked or provided with suitable graduations in order to readily indicate to the operator whether or not he is at all times cutting and planing the grade accurately. This marking may be indicated in any one of various ways. In the particular instance shown the downwardly extending portion of the guide is red above the line 88 and white below, so that the operator by maintaining the line between the red and white even with the templet, he will at all times know that he is cutting and planing a true and accurate base corresponding to the depth indicated by the templet. For the purpose of adjusting the guide for different elevations of templets with respect to the grade surfaces, the rod 84 at its upper end is provided with a substantial number of screw threads and a thumb screw 89 so that by turning this thumb screw in the proper direction the line of demarcation on the guide may be raised or lowered to correspond with the vertical distance of the templet above the base to be prepared. The swinging of the machine or frame work due to the wheels passing over uneven surfaces does not affect the cutter guide as the pendulum 83 at all times hangs in a substantially vertical position and does, through the pivotal connections shown, automatically maintain the guide in substantially the same position vertically, and in registry with the templet.

I provide a substantial tension spring 90 pivotally connected at its upper end to the arm 75 by means of the link 91 while the opposite end of this spring is connected by any suitable means to the front of the rear pivoted frame member. In the particular instance shown it is connected by means of an eye bolt to the lower end of the inner standard 22. The spring 90 is a tension member which holds up the hinged ends of the two parts of the frame and yet permits the two parts of the frame to be moved into different angular relations with respect to each other.

I have so arranged or mounted the motor or engine on the hinged frame work in the region of the axis of the cutter and planer shaft that when the cutter and planer is in operation the engine not only rotates the cutter and planer through a direct positive connection, but at the same time, due to its tendency to reciprocate, imparts a rapid but very slight undulating movement or action to the cutter and planer knives, thus causing them to produce a progressive and successive slight chiseling action which accentuates and assists the cutting and planing by having a tendency to chisel or loosen the usual hard material encountered.

Assuming the parts are assembled as shown in the drawings just described, and it is desired to utilize my invention and assuming the grade has been ascertained and the templet placed, the operator mounted on the seat, starts the engine and by means of his feet steers it so that the indicator 79 engages with, or is in alignment with, the templet. At the same time his hands are free to turn the adjusting wheel 67 until the grade marking on the member 87 registers with the templet 88ª. The machine then proceeds forward, cutting and planing the desired grade, under ordinary conditions, to the extent of about 700 feet per hour with comparatively little effort from the operator, producing a grade true to the templet with a solid substantial firm basis.

It will be seen that I have produced an invention possessing to the fullest extent all of the foregoing and many other inherent advantages and that the results set forth as well as others, are accomplished by its use.

As before stated, many changes and modifications may be resorted to without departing from the spirit and scope of my invention as defined in the following claims.

Having thus described my invention, I claim:

1. In a machine for cutting and planing a base for guide rails to a pre-determined grade, comprising a rotatable cutting element having a plurality of knives so mounted as to operate approximately at a 45° angle to the surface and the axle on the rotatable element.

2. The combination with a frame composed of a front part and a rear part which are hinged together transversely of the frame, of a cutter supported by the rear part of the frame, a wheel tracking behind the cutter and supporting one side of the rear part of the frame, a wheel for supporting the opposite side of the rear part of the frame, a wheeled support for the front part of the frame, a motor carried by the frame and adapted to propel the same and rotate the cutter, means carried by the frame and connected with the wheeled support for the front part of the frame for steering the frame, and means carried by the frame and connected with both the front part of the frame and the rear part of the frame for changing the angular relationships between them.

3. The combination with a frame, of a plurality of wheels for supporting the same, one of said wheels being a traction wheel for propelling the frame, another of said wheels supporting the front of the frame, and another of said wheels being located in a different path of travel from said traction wheel, a cutting and planing element located in front of said traction wheel and substantially in the same vertical longitudinal plane with said traction wheel so that sideways tipping of the frame will not substantially change the elevation of the cutting and planing element, a motor carried by said frame and adapted to rotate said traction wheel, means carried by the frame by which the front wheel may be turned to steer the frame, and means carried by the frame adapted to change the vertical relationship of the front wheel with respect to the traction wheel and the cutting and planing element with respect to either the front wheel or the traction wheel, or both of said wheels.

4. The combination with a frame, of supporting wheels at opposite sides of the frame, a cutter located in the line of travel of a wheel on one side of the frame, a steering support for the frame, a guide yieldingly secured on the same side of the frame as the cutter so as to yield horizontally upon contact with a line, and means to maintain the guide in a substantially vertical position, regardless of sideways tilting of the frame, so that the guide will not tend to either lift up or bear down upon a line.

5. In a machine for cutting a base of the character described to a predetermined grade, a combination of a two-part hinged carrying frame, provided with wheels to support the front and rear and opposite sides thereof, a cutting element, means for adjusting said cutting element, a substantially perpendicular guide for co-acting with a templet for indicating the position of the cutting element, means for maintaining said guide substantially vertical regardless of sideways tipping of the frame, means for steering the frame, and a steering guide connected to the frame.

6. The combination with a frame supported at its front end, its rear end, and at both sides, so that it is free to tip endways or sideways, of a cutter located substantially in the same vertical, longitudinal plane as a support for one side of the frame so that tilting of the frame sideways will not substantially change the elevation of the cutter with respect to that support, and means for counter-acting endwise tilting of the frame to maintain the cutter in a substantially constant position with reference to a grade to be cut.

7. The combination with a frame supported at at least three points so as to be in stable equilibrium, of a cutter secured thereto, propelling means for the frame, steering means for the frame, a vertical guide connected with the frame, yieldable means for permitting said guide to yield towards the rear of the frame, and means to maintain said guide in a vertical position regardless of the sideways tilting of the frame.

8. The combination with a frame composed of front and rear parts hinged together transversely of the frame, of a propelling wheel for supporting a side and end of the rear part of the frame, a steering wheel for supporting the front end of the front part of the frame, a wheel for supporting the frame so that it is in stable equilibrium, a cutter located in substantially the same vertical and longitudinal plane as the propelling wheel, a motor for propelling the frame and cutter, means for changing the relationship of the cutter with respect to a plane upon which the propelling wheel and the steering wheel might rest, a substantially vertical guide located adjacent the cutter, and means to maintain said guide in a substantially vertical position regardless of sideways tilting of the frame.

9. The combination with an endwise movable frame, of a cutter located at one side of the frame, a support for the opposite side of the frame, and a gravity-actuated, vertical indicator supported from the side of the frame on which the cutter is located, said indicator being mounted to yield horizontally while maintaining its vertical position.

10. The combination with an endwise movable frame, of a cutter located at one side of the frame, a support for the opposite side of the frame, a gravity-actuated, vertical indicator supported at the side of the frame where the cutter is located, and a spring adapted to hold said indicator in contact with a line to allow yielding of said indicator while maintaining its vertical position.

In witness whereof I hereunto subscribe my name to this specification.

EDWARD G. CARR.